US012800713B2

(12) United States Patent
Zhan et al.

(10) Patent No.: US 12,800,713 B2
(45) Date of Patent: Nov. 17, 2026

(54) VEHICLE ADAS CALIBRATION DEVICE

(71) Applicant: SHENZHEN SMARTSAFE TECH CO., LTD., Shenzhen (CN)

(72) Inventors: Wei Zhan, Shenzhen (CN); Hanyao Ding, Shenzhen (CN); Hongbo Yu, Shenzhen (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 286 days.

(21) Appl. No.: 18/708,794

(22) PCT Filed: Nov. 10, 2021

(86) PCT No.: PCT/CN2021/129690
§ 371 (c)(1),
(2) Date: May 9, 2024

(87) PCT Pub. No.: WO2023/082075
PCT Pub. Date: May 19, 2023

(65) Prior Publication Data
US 2025/0028023 A1 Jan. 23, 2025

(51) Int. Cl.
*G01S 7/40* (2006.01)
*F16M 11/18* (2006.01)
*F16M 11/42* (2006.01)

(52) U.S. Cl.
CPC ............... *G01S 7/40* (2013.01); *F16M 11/18* (2013.01); *F16M 11/42* (2013.01)

(58) Field of Classification Search
None
See application file for complete search history.

(56) References Cited

U.S. PATENT DOCUMENTS

2019/0004147 A1 1/2019 Conrad et al.
2022/0043110 A1* 2/2022 Wang .................... G01S 7/4026
(Continued)

FOREIGN PATENT DOCUMENTS

CN 111520594 A 8/2020
CN 111521211 A 8/2020
CN 212408160 U 1/2021
(Continued)

OTHER PUBLICATIONS

Joovy, Caboose Graphite 814X, Instruction Manual (Year: 2015).*
(Continued)

*Primary Examiner* — Olumide Ajibade Akonai
*Assistant Examiner* — Ashley Brown Raynal
(74) *Attorney, Agent, or Firm* — CANTOR COLBURN LLP

(57) ABSTRACT

A vehicle ADAS calibration device, including: a support platform; a lifting mechanism, foldable on the support platform, the lifting mechanism being hinged to the support platform; and an foldable arm mechanism, foldable on the lifting mechanism. The foldable arm mechanism is mounted on the lifting mechanism. By folding the foldable arm mechanism onto the lifting mechanism, the width of the vehicle ADAS calibration device can be reduced; and by folding the lifting mechanism onto the support platform, the height of the vehicle ADAS calibration device can be reduced, thereby facilitating storage and transportation.

18 Claims, 8 Drawing Sheets

(56) References Cited

U.S. PATENT DOCUMENTS

| | | | | |
|---|---|---|---|---|
| 2022/0049954 | A1* | 2/2022 | Lai | G01S 7/497 |
| 2024/0401924 | A1* | 12/2024 | Zheng | G01B 5/0025 |

FOREIGN PATENT DOCUMENTS

| | | | | | |
|---|---|---|---|---|---|
| CN | 112567204 | A | | 3/2021 | |
| CN | 112578347 | A | | 3/2021 | |
| CN | 112578349 | A | | 3/2021 | |
| CN | 213040189 | U | | 4/2021 | |
| CN | 112964273 | A | | 6/2021 | |
| CN | 112964274 | A | * | 6/2021 | G01C 25/00 |
| CN | 113324496 | A | * | 8/2021 | G01B 11/27 |
| CN | 214333850 | U | | 10/2021 | |
| CN | 216668773 | U | | 6/2022 | |

OTHER PUBLICATIONS

International Search Report for International Application No. PCT/CN2021129690; Mailing Date, Jul. 28, 2022.
Written Opinion for International Application No. PCT/CN2021129690; Mailing Date, Jul. 28, 2022.

* cited by examiner

VEHICLE ADAS CALIBRATION DEVICE

CROSS-REFERENCE TO RELATED APPLICATIONS

This application is the U.S. national phase of International Application No. PCT/CN2021/129690 with an international filing date of Nov. 10, 2021, designating the U.S., the contents of which is incorporated herein by reference.

TECHNICAL FIELD

The present application relates to the technical field of vehicle maintenance and calibration equipment, and more specifically, relates to a vehicle ADAS calibration device.

BACKGROUND

Advanced Driver Assistant System, referred to as ADAS, is to use various sensors installed on a vehicle to collect environmental data inside and outside the vehicle in the first time, and perform technical processing such as identification, detection, and tracking of dynamic and static objects, so as to enable a driver to detect possible dangers in a fastest time to draw attention and improve safety and active safety technology.

When calibrating a heavy-duty truck, due that the vehicle has large width and height, large target, high mounting position, large mass, and large boom length, the ADAS calibration device has very large height and width, which is inconvenient for transport and storage of the ADAS calibration device.

SUMMARY

The purpose of embodiments of the present application is to provide a vehicle ADAS calibration device to solve the technical problem existing in the prior art that the ADAS calibration device has a large height and width, which is inconvenient for transportation and storage of the ADAS calibration device.

To achieve the above objects, the present application adopts the following technical solutions: a vehicle ADAS calibration device is provided. The vehicle ADAS calibration device comprises:

- a support platform;
- a lifting mechanism, which is foldable onto the support platform and is hingedly installed on the support platform; and
- a foldable arm mechanism, which is foldable onto the lifting mechanism and is installed on the lifting mechanism.

In an embodiment, the vehicle ADAS calibration device further comprises: a centering platform, which is configured for adjusting a position of a target, and a rotating platform, which is configured for adjusting an angle of the target. The centering platform is installed on the support platform, the rotating platform is installed on the centering platform, and the rotating platform is in hinge connection with a lower end of the lifting mechanism.

In an embodiment, the centering platform comprises: a first slide seat, which is arranged along a width direction of the support platform, a second slide seat, which is slidably installed on the first slide seat, a second guide rail assembly, which is in slidable connection with the first slide seat and the second slide seat, and a first adjusting assembly, which is configured for adjusting a moving position of the second slide seat. The first slide seat and the second slide seat are arranged side by side, the second guide rail assembly is arranged along the width direction of the support platform, the first adjusting assembly is installed on the first slide seat, and the first adjusting assembly is in connection with the second slide seat, and the rotating platform is installed on the second slide seat.

In an embodiment, the rotating platform comprises: a rotating seat, which is rotatably installed on the centering platform, and an angle adjusting assembly, which is configured to adjust a rotation angle of the rotating seat. The angle adjusting assembly is installed on the centering platform. The angle adjusting assembly is in connection with the rotating seat.

In an embodiment, a first hinge assembly and a first locking structure are installed on the rotating platform, the first hinge assembly is in hinge connection with a lower end of the lifting mechanism, and the first locking structure is configured to lock the lifting mechanism and the rotating platform in a case where the lifting mechanism is erected.

In an embodiment, the vehicle ADAS calibration device further comprises a mounting frame. The mounting frame is foldable onto the lifting mechanism, and the mounting frame is hingedly installed on an upper end of the lifting mechanism.

In an embodiment, a second hinge assembly and a second locking structure are installed on the upper end of the lifting mechanism, the second hinge assembly is in hinge connection with a lower end of the mounting frame, and the second locking structure is configured to lock the mounting frame and the lifting mechanism in a case where the mounting frame is erected.

In an embodiment, the lifting mechanism comprises: a stand, a lifting frame, which is vertically and slidably installed on the stand and is in connection with the foldable arm mechanism, and a drive assembly, which is configured to drive the lifting frame and the foldable arm mechanism to ascend and descend. A lower end of the stand is in hinge connection with the support platform. The drive assembly is installed on the stand. The foldable arm mechanism is in connection with the drive assembly.

In an embodiment, the foldable arm mechanism comprises: a connecting arm, which is installed on the lifting mechanism; two branch arms, which are respectively arranged at two ends of the connecting arm; and third hinge assemblies, which are configured to respectively hinge the two branch arms to the two ends of the connecting arm.

In an embodiment, the support platform comprises: a base frame, which is configured to support the lifting mechanism, a travel assembly, which is configured to support the base frame in a rolling manner, and a positioning assembly, which is configured to adjust the base frame to be horizontal and to position and support the base frame. The traveling assembly and the positioning assembly are installed on the base frame, respectively.

Beneficial effects of the vehicle ADAS calibration device provided by the embodiments of the present application are summarized as follows: the vehicle ADAS calibration device of this structure can reduce the width of the vehicle ADAS calibration device by folding the foldable arm mechanism on the lifting mechanism, and can reduce the height of the vehicle ADAS calibration device by folding the lifting mechanism on the support platform, thereby reducing the size of the vehicle ADAS calibration device and being convenient for storage and transportation.

BRIEF DESCRIPTION OF THE DRAWINGS

In order to more clearly illustrate the technical solutions in embodiments of the present application, accompanying drawings that need to be used in the embodiments or exemplary technical descriptions will be briefly introduced hereinbelow. Obviously, the accompanying drawings in the following descriptions are only some embodiments, those skilled in the art can also obtain other drawings based on these drawings without creative efforts.

DETAILED DESCRIPTION OF THE EMBODIMENTS

In order to make the technical problems, technical solutions and beneficial effects to be solved by the present application clearer, the present application will be further described in detail below in conjunction with the accompanying drawings and embodiments. It should be understood that the specific embodiments described here are only configured to explain the present application, but are not intended to limit the present application.

It should be understood that the orientation or positional relationship indicated by the terms "length", "width", "upper", "lower", "vertical", "horizontal", "inner", and "outer", etc. are based on the drawings. The orientation or positional relationship shown is only for the convenience of describing the present application and simplifying the description, and does not indicate or imply that the device or element referred to must have a specific orientation, be constructed and operated in a specific orientation, and therefore cannot be interpreted as limiting the scope of the present application.

Figure 1:
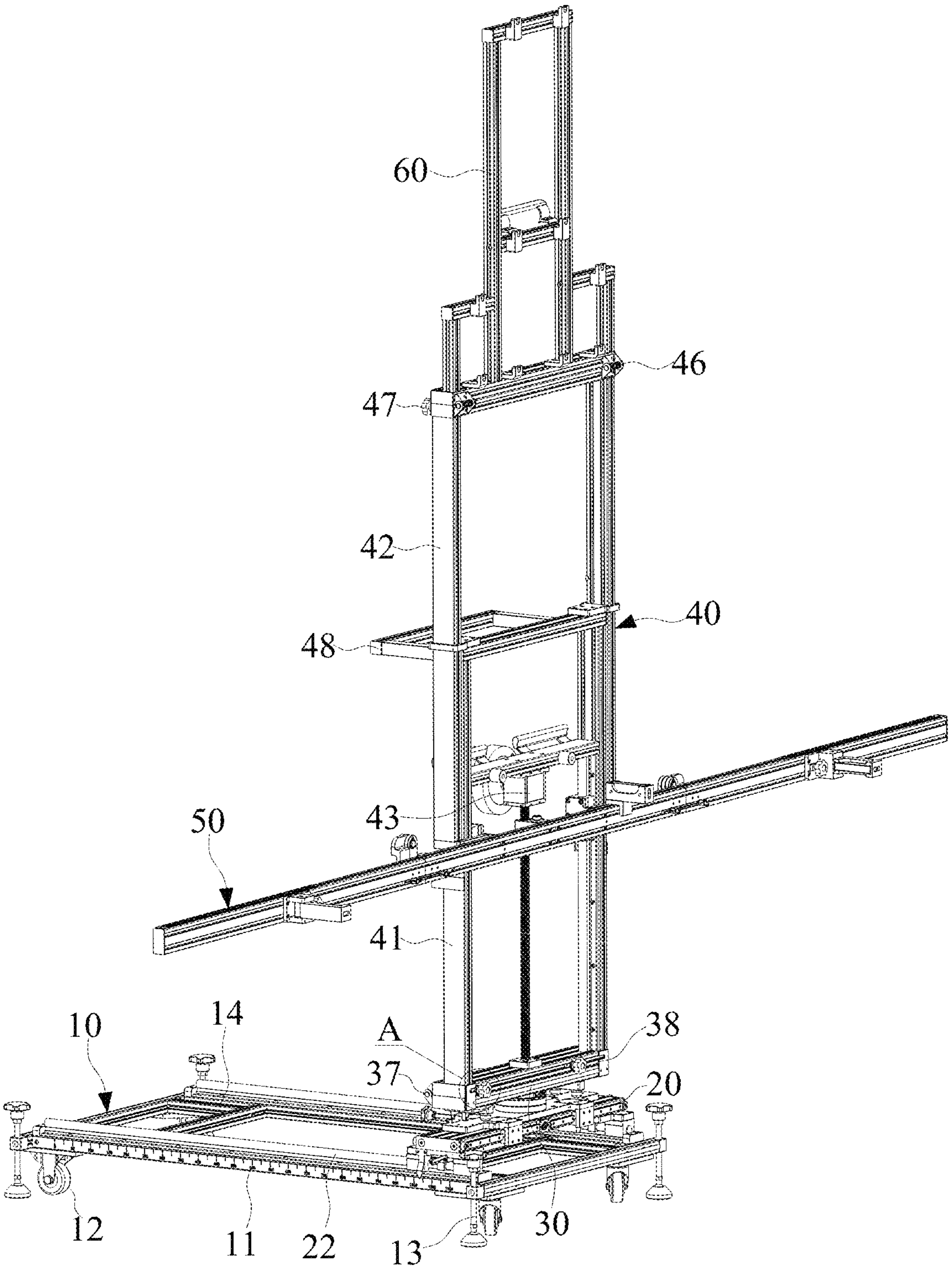
FIG. 1 is a perspective structural schematic view of a vehicle ADAS calibration device provided by an embodiment of the present application.
Figure 2:
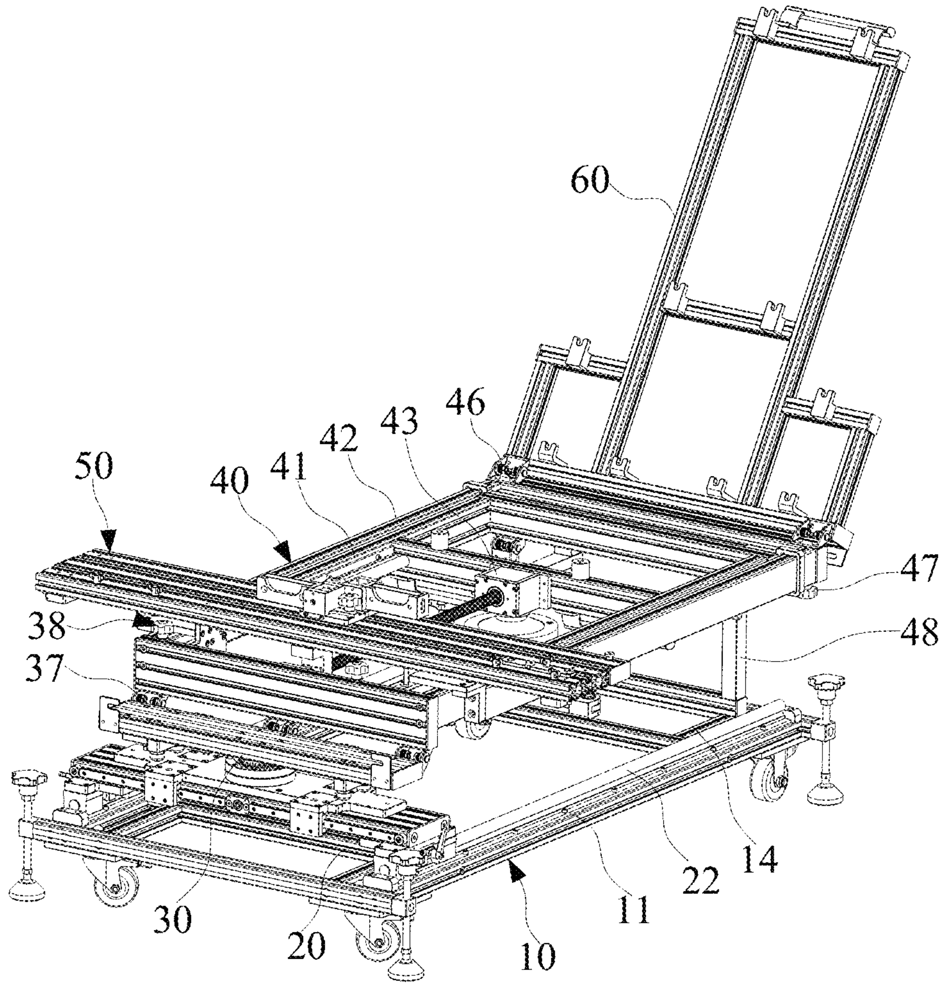
FIG. 2 is a perspective structural schematic view of the vehicle ADAS calibration device in FIG. 1 after being partially folded.

Referring to FIG. 1 and FIG. 2 together, the vehicle ADAS calibration device provided by the embodiments of the present application will be described hereinbelow. The vehicle ADAS calibration device comprises: a support platform 10, a lifting mechanism 40, and a foldable arm mechanism 50. The lifting mechanism 40 is hingedly installed on the support platform 10. The lifting mechanism 40 is foldable onto the support platform 10. The lifting mechanism 40 is configured to support lifting of a target. The foldable arm mechanism 50 is installed on the lifting mechanism 40, the foldable arm mechanism 50 is foldable onto the lifting mechanism 40, and the foldable arm mechanism 50 is configured for centering detection of the target. In this way, the foldable arm mechanism 50 is foldable onto the lifting mechanism 40 to reduce a width of the vehicle ADAS calibration device occupied by the foldable arm mechanism 50, and the lifting mechanism 40 is foldable onto the support platform 10 to reduce the vehicle ADAS calibration device, thereby reducing the height and the width of the vehicle ADAS calibration device, reducing the space occupied by the vehicle ADAS calibration device, and facilitating the storage and transportation of the vehicle ADAS calibration device.

Figure 5:
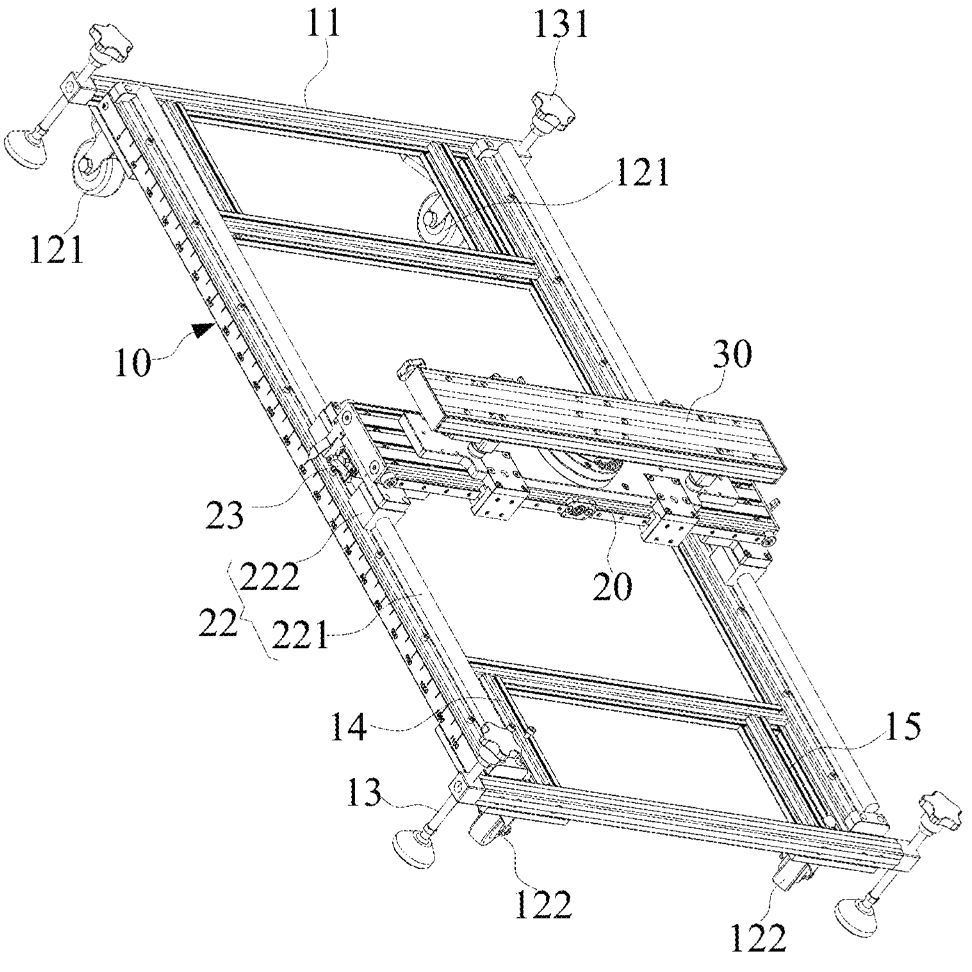
FIG. 5 is a perspective structural schematic view of a support platform, a centering platform, and a rotating platform in FIG. 1.

In an embodiment of the present application, referring to FIG. 1, FIG. 2, and FIG. 5, the vehicle ADAS calibration device further comprises a centering platform 20 and a rotating platform 30, and the centering platform 20 is configured to adjust a position of the target along a width direction of the support platform 10, so that the target is centered with the vehicle, the centering platform 20 is installed on the support platform 10, the rotating platform 30 is configured to adjust an angle of the target, so that the target directly faces the vehicle, and the rotating platform 30 is installed on the centering platform 20, a lower end of the lifting mechanism 40 is in hinge connection with the rotating platform 30. In this way, the positions of the lifting mechanism 40 and the foldable arm mechanism 50 can be fine-tuned through the centering platform 20 to accurately control the centering of the target, moreover, the rotation angle of the lifting mechanism 40 can be accurately adjusted by the rotating platform 30 to accurately control the target to directly align with the vehicle, such that the precise adjustment of the horizontal position and angle of the target are realized, which is convenient for vehicle calibration.

In an embodiment, referring to FIG. 1, FIG. 2, and FIG. 5, a first guide rail assembly 22 is installed on the support platform 10, the first guide rail assembly 22 is arranged along a length direction of the support platform 10, the first guide rail assembly 22 is in slidable connection with the centering platform 20 and the support platform 10; and a first locking assembly 23 is installed on the centering platform 20, and the first locking assembly 23 is configured to lock the first guide rail assembly 22. In this way, the centering platform 20 can be guided to move in a straight line to fine-tune the distance from the target to the vehicle, avoiding the overall movement of the vehicle ADAS calibration device, and after the position adjustment of the centering platform 20 is completed, the first locking assembly 23 will lock the centering platform 20 with the first guide rail assembly 22, thereby ensuring the stability of the position of the centering platform 20.

Optionally, the first guide rail assembly 22 comprises a first rail 221 and a first slider 222, the first rail 221 is installed on the support platform 10, the first slider 222 is installed on the centering platform 20, the first slider 222 is in slidable connection with the first guide rail 221; the first locking assembly 23 is installed on the centering platform 20, and the first locking assembly 23 locks the position of the centering platform 20 by locking the first guide rail 221, thus preventing the movement of the centering platform 20 during the calibration process. Optionally, two first rail assemblies 22 are provided, and the two first rail assemblies 22 are respectively located at two ends of the support platform 10 along the width direction, and two ends of a first slider seat 21 are respectively connected with corresponding first guide rail assemblies, which is conducive to improving the stability of the centering platform 20.

In an embodiment, the first locking assembly 23 comprises: a guide assembly, two clamping blocks, and a screw mechanism, the guide assembly has a first chute, and the two clamping blocks are slidably connected in the first chute of the guide assembly, the screw mechanism is rotatably connected to the guide assembly, and the screw mechanism is in connection with the two clamping blocks. When the screw mechanism rotates around the guide assembly, the two clamping blocks move toward each other or move away from each other along the first chute, so as to lock or release the first guide rail 221.

Optionally, the screw mechanism comprises a screw rod and a knob, the screw rod is rotatably connected to the guide assembly, the knob is in connection with the screw rod, the screw rod has a forward thread segment and a reverse thread segment, one of the clamping blocks is in fitness connection with the forward thread segment, and the other one of the clamping blocks is in fitness connection with the reverse thread segment. In this way, by turning the screw rod, the two clamping blocks can clamp or release the first guide rail 221.

Figure 6:
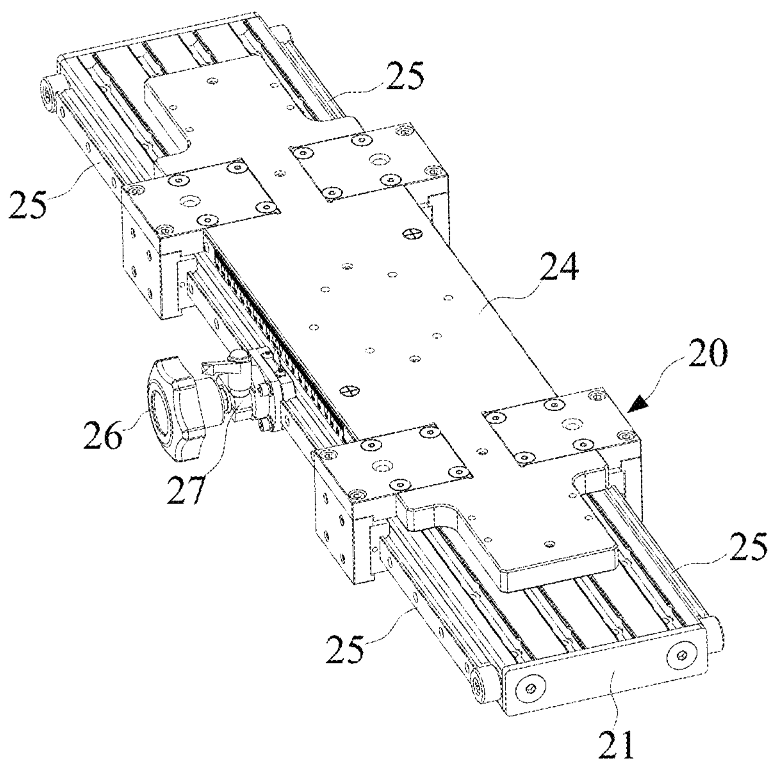
FIG. 6 is a perspective structural schematic view of the centering platform in FIG. 5.
Figure 7:
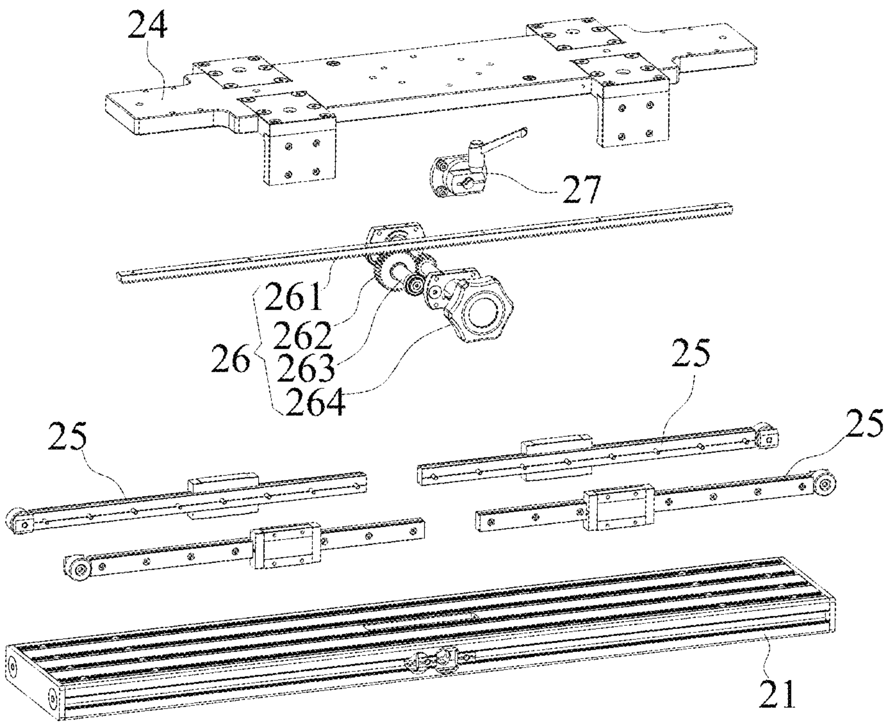
FIG. 7 is an exploded view of THE centering platform in FIG. 6.

In an embodiment of the present application, referring to FIGS. 5-7, the centering platform 20 comprises: a first slide seat 21, a second slide seat 24, a second guide rail assembly 25, and a first adjusting assembly 26. The first slide seat 21 is arranged along a width direction of the support platform 10, the second slide seat 24 is slidably installed on the first slide seat 21, the second slide seat 24 is arranged side by side with the first slide seat 21, and the second guide rail assembly 25 is slidably connected to the first slide seat 21 and the second slide seat 24, the first adjusting assembly 26 is configured to adjust a moving position of the second slide seat 24 along the width direction of the support platform 10, the second guide rail assembly 25 is arranged along the width direction of the support platform 10. The first adjusting assembly 26 is installed on the first slide seat 21, and the first adjusting assembly 26 is in connection with the second slide seat 24. The rotating platform 30 is installed on the second slide seat 24. The second guide rail assembly 25 can guide the second slide seat 24 to move linearly on the first slide seat 21, and the first adjusting assembly 26 can accurately adjust the moving position of the second slide seat 24 to ensure the centering of the target with the foldable arm mechanism 50. Further, the second guide rail assembly 25 and the first guide rail 221 are perpendicular to each other, and both are perpendicular to the vertical direction. The cooperation between the second guide rail assembly 25 and the first guide rail assembly 22 can accurately adjust the horizontal positions of the target and the foldable arm mechanism 50. Optionally, the second guide rail assembly 25 may be a linear crossed roller guide rail, or alternatively, the second guide rail assembly 25 comprises a second guide rail and a second slider, and is in slidable connection with the second guide rail through the second slider, so that the second slider seat 24 and the first slide seat 21 can slide relative to each other.

Optionally, the number of the second guide rail assemblies 25 is two pairs, and the two second guide rail assemblies 25 in each pair are installed on the two ends of the width direction of the first slide seat 21 respectively, and the two pairs of second guide rail assemblies 25 are respectively located at Both ends of the first slide seat 21 in the length direction can reduce the length of the second guide rail assembly 25 and improve the stability of the second slide seat 24.

In an embodiment, referring to FIGS. 5-7, the first adjusting assembly 26 comprises: a transmission rack 261, a drive gear 262, a support shaft 263, and a first screw member 264. The transmission rack 261 is installed on the second slide seat 24, the drive gear 262 meshes with the transmission rack 261, the drive gear 262 is installed on the support shaft 263, the support shaft 263 is rotatably mounted on the first slide seat 21, and the first screw member 264 is in connection with the support shaft 263. In this way, the position of the second slide seat 24 can be accurately adjusted by rotating the first screw member 264.

In an embodiment, referring to FIGS. 5-7, a second locking component 27 is installed on the first slide seat 21, and the second locking component 27 is configured to lock the first adjusting component 26. In this way, the first adjusting assembly 26 can be locked by the second locking assembly 27 to ensure the stability of the position of the second slide seat 24. Optionally, the second locking assembly 27 is in connection with the support shaft 263, and the second locking assembly 27 is configured to lock the support shaft 263. After the second locking assembly 27 locks the support shaft 263, the position of the second slide seat 24 can be fixed. Optionally, the second locking component 27 may have the same or similar structure as the first locking component 23.

Figure 8:
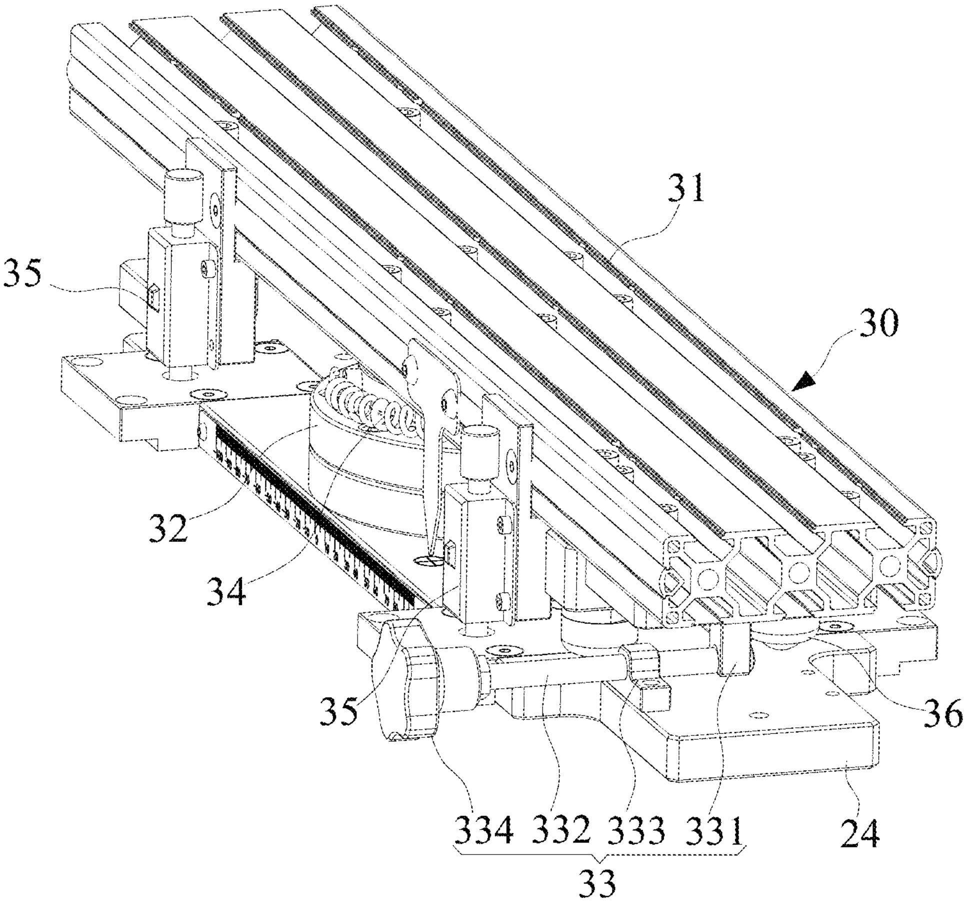
FIG. 8 is a perspective structural schematic view of a rotating platform and a second slide seat in FIG. 5.

In an embodiment of the present application, referring to FIG. 5 and FIG. 8, the rotating platform 30 comprises a rotating seat 31 and an angle adjusting assembly 33. The rotating seat 31 is rotatably installed on the centering platform 20. The angle adjusting assembly 33 is configured to adjust a rotation angle of the rotating seat 31. The angle adjusting assembly 33 is installed on the centering platform 20, and the angle adjusting assembly 33 is in connection with the rotating seat 31. In this way, the rotation angle of the lifting mechanism 40 can be accurately controlled by the angle adjusting assembly 33 to accurately adjust the rotation angle of the target.

Figure 9:
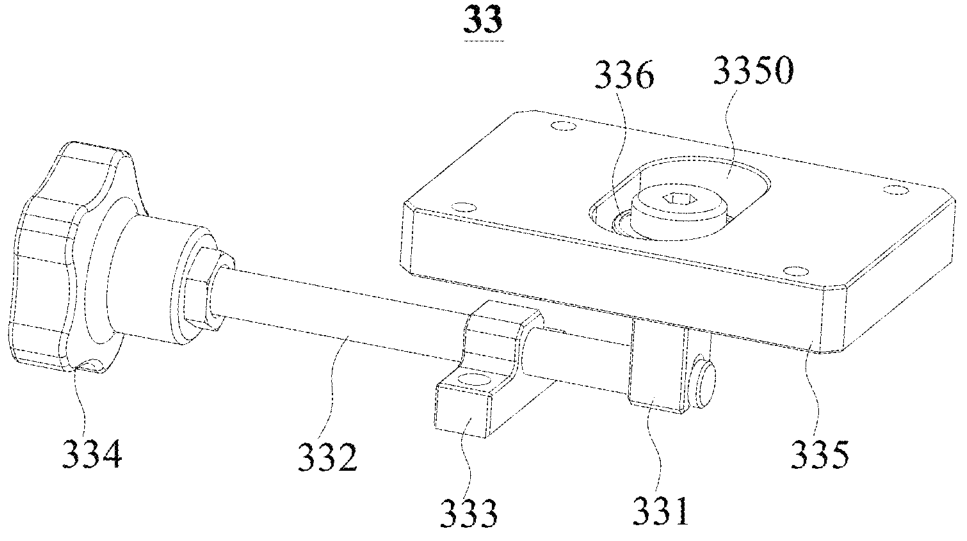
FIG. 9 is a perspective structural schematic view of an angle adjusting assembly in FIG. 8.
Figure 10:
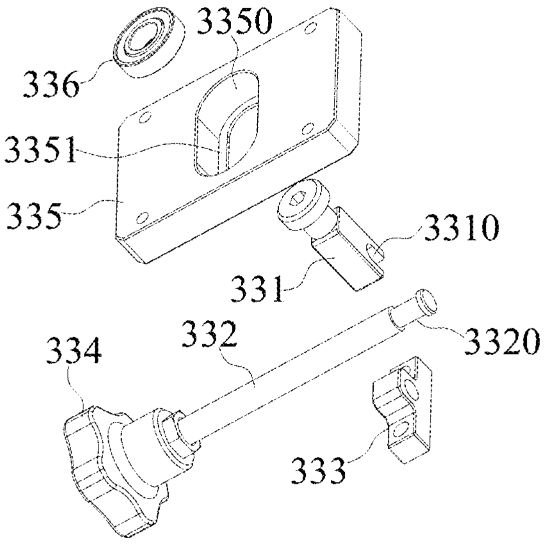
FIG. 10 is an exploded view of the angle adjusting assembly in FIG. 9.

In an embodiment of the present application, referring to FIGS. 8-10, the angle adjusting assembly 33 comprises: a locking base 331, a screw nut base 333, and an adjusting screw rod 332. The locking base 331 is installed on the rotating seat 31, and the screw nut base 333 is installed on the centering platform 20, the adjusting screw rod 332 is installed on the screw nut base 333, and the adjusting screw rod 332 is provided with a limiting structure 3320. The limiting structure 3320 is configured to lock the locking base 331, and the adjusting screw rod 332 is in threaded connection with the screw nut base 333. Specifically, the screw nut base 333 is in connection with the second slide seat 24. When the adjusting screw rod 332 rotates, the adjusting screw rod 332 drives the locking base 331 to approach or move away from the screw nut base 333, and the locking base 331 drives the rotating seat 31 to rotate, thereby realizing the adjustment of the rotation angle of the rotating seat 31. The use of the adjusting screw rod 332 and the screw nut base 333 can improve the accuracy of the angle adjustment, and when the locking base 331 is clocked at the limiting structure 3320, the rotation angle can be maintained stable.

In an embodiment, referring to FIGS. 8-10, the limiting structure 3320 is a ring groove, and the locking base 331 fits into the ring groove. This prevents the locking base 331 from interfering with the rotation of the adjusting screw rod 332, and when the adjusting screw rod 332 moves along the width direction of the second slide seat 24, the adjusting screw rod 332 can drive the rotating seat 31 to rotate. Optionally, a first slot 3310 is defined in the locking base 331, and the adjusting screw rod 332 is clamped at the first slot 3310 at a position corresponding to the ring groove. In this way, the locking base 331 can be locked in the ring groove, and it is prevented the adjusting screw rod 332 from being separated from the locking base 331. It can be understood that in other embodiments, the limiting structure 3320 may also adopt structures, such as a protruding ring.

In an embodiment, referring to FIGS. 8-10, a fixed base 335 is installed at the rotating seat 31, and the fixed base 335 defines therein a slideway 3350. The slideway 3350 is arranged along a length direction of the rotating seat 31. One end of the locking base 33 close to the rotating seat 31 is in slidable connection with the slideway 3350. The adjusting screw rod 332 is basically arranged along a width direction of the first slide seat 21. When the adjusting screw rod 332 is rotated, a vertical distance from the limiting structure 3320 to a rotation axis of the rotating seat 31 will change, and in the case where the vertical distance from the limiting structure 3320 to a rotation axis of the rotating seat 31 changes, the limiting structure 3320 can drive the locking base 331 to slide along the slideway 3350 at the fixed seat 335 to match the position of the limiting structure 3320, so that during the rotation of the rotating seat 31, the limiting structure 3320 and the locking base 331 always have equal vertical distance to the rotation axis of the rotating seat 31.

In another embodiment, the screw nut base 333 is in slidable connection with the second slide seat 24. Optionally, a fourth guide rail is installed on the second slide base 24, the fourth guide rail is arranged along the length direction of the second slide base 24, a fourth slider is installed on the screw nut base 333, and the fourth slider is in slidable connection with the fourth guide rail. The screw nut base 333 slides along the length direction of the second slide seat 24 to make the limiting structure 3320 match with the position of the locking base 331.

In an embodiment, referring to FIGS. 8-10, the slideway 3350 is a bar-shaped hole, the locking base 331 is sleeved within a rotating bearing 336, and the rotating bearing 336 is slidably received in the bar-shaped hole. During the rotation of the rotating seat 31, the rotating bearing 336 can support the rotation of the locking base 331, so that the angle of the locking base 331 matches the angle of the adjusting screw rod 332. It can be understood that the slideway 3350 may also adopt a structure of a bar-shaped groove or a structure of a guide rail.

Optionally, a flange 3351 is provided in the strip-shaped hole, and the flange 3351 is located on a side of the strip-shaped hole close to the second slide seat 24, and the flange 3351 is configured to stop the rotating bearing 336, such that the rolling bearing 336 is prevented from falling. Optionally, a second screw member 334 is installed on the adjusting screw rod 332. The second screw member 334 is conducive to manually screwing the adjusting screw rod 332, thereby facilitating the angle adjustment.

In an embodiment, referring to FIG. 8, the rotating platform 30 comprises a support bearing 32, and the support bearing 32 is rotatably connected to the rotating seat 31 and the centering platform 20, so that the supporting area of the rotating seat 31 can be increased, and stability of the rotating seat 31 can be improved. Optionally, the support bearing 32 is a crossed roller bearing, which is beneficial to improve the stability of the rotating seat 31 and prevent the target from shaking. It can be understood that in other embodiments, a rotating shaft may also adopted to support the rotation of the rotating seat 31.

In an embodiment of the present application, referring to FIGS. 8-10, the rotating platform 30 further comprises an elastic member 34, and the elastic member 34 is configured to elastically pull the rotating seat 31 to reset. The elastic member 34 makes the locking base 331 abut against a side of the ring groove, preventing the locking base 331 from moving along an axis direction of the ring groove, thereby preventing the lifting mechanism 40 from swinging, and improving the accuracy and stability of angle adjustment. Optionally, the elastic member 34 is a tension spring.

Optionally, an outer ring of the support bearing 32 is in connection with the second slide seat 24, an inner ring of the support bearing 32 is in connection with the rotating seat 31. By connecting the outer ring of the support bearing 32 with the second sliding base 24, the stability of the rotating seat 31 can be improved. Specifically, connecting rings are installed at both ends of the support bearing 32, and connectors are installed at the connecting rings, respectively, and the two ends of the tension spring are respectively connected with the connectors, so as to control the support bearing 32 to reset and to facilitate the installation of the tension spring.

In an embodiment of the present application, referring to FIG. 8, a plurality of universal wheels 36 are installed on the rotating seat 31, and the plurality of universal wheels 36 are respectively arranged at two ends of the rotating seat 31, and the plurality of universal wheels 36 are rollingly supported on the second slide seat 24. In this way, it is beneficial to improve the rotation stability of the rotating seat 31. The plurality of universal wheel 36 can be bull's eye wheel.

In an embodiment of the present application, referring to FIG. 8, a third locking assembly 35 is installed on the rotating seat 31, and when the rotating seat 31 rotates to an original position, the third locking assembly 35 can locking positions of the rotating seat 31 and the second slide seat 24, thereby preventing the rotation of the rotating seat 31 and ensure the stability of the angle adjusting assembly 33 and facilitating the movement and transportation of the vehicle ADAS calibration device. Optionally, the third locking component 35 is a bolt, and the second slide seat 24 is provided with an insertion hole for inserting the bolt. It can be understood that the third locking component 35 may also adopt a hook structure or a lock catch structure.

Figure 3:
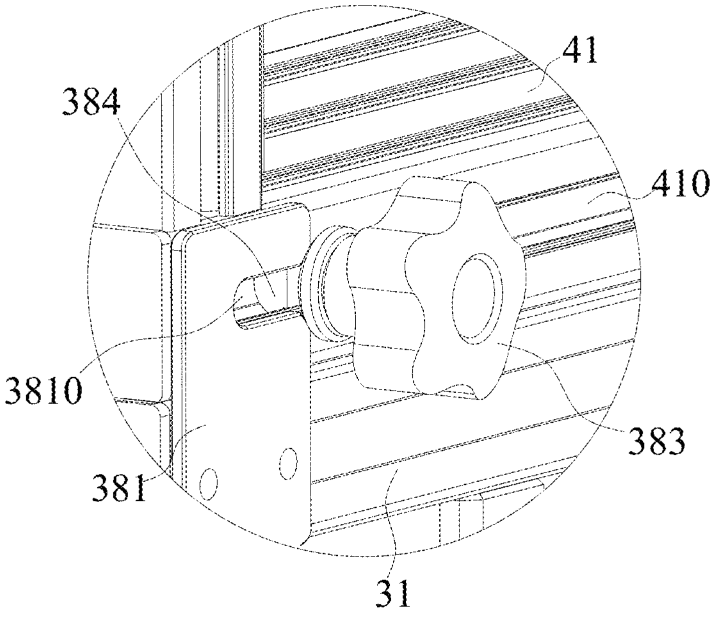
FIG. 3 is an enlarged view of part A in FIG. 1.

In an embodiment of the present application, referring to FIGS. 1-3, a first hinge assembly 37 and a first locking structure 38 are installed on the rotating platform 30, the first hinge assembly 37 is in hinge connection with a lower end of the lifting mechanism 40, and the first locking structure 38 is configured to lock the lifting mechanism 40 and the rotating platform 30 in a case where the lifting mechanism 40 is erected. In this way, when the first locking structure 38 is opened, the lifting mechanism 40 is foldable onto the support platform 10; and when the lifting mechanism 40 is erected, the first locking structure 38 locks the lifting mechanism 40, such that the lifting mechanism 40 is maintained erected, which ensures the vertical arrangement of the target. Optionally, the first hinge assembly 37 and the first locking structure 38 are respectively located at two ends of the lifting mechanism 40 in the width direction. The width direction of the lifting mechanism 40 is perpendicular to the vertical direction and the length direction of the lifting mechanism 40. When the lifting mechanism 40 is unfolded, the first locking structure 38 can cooperate with the first hinge assembly 37 to restrict the swinging of the lifting mechanism 40 and improve the stability of the lifting mechanism 40. Optionally, a plurality of first hinge assemblies 37 and a plurality of first locking structures 38 are provided, which is beneficial to improve the stability of the lifting mechanism 40 when it is erected and locked.

Optionally, the first hinge assembly 37 is a damping hinge. The use of the damping hinge can slow down the folding speed of lifting mechanism 40 when the lifting mechanism 40 is folded, reduce a supporting force of stopping an upper end of the lifting mechanism 40 during the folding, and prevent the lifting mechanism 40 from falling quickly towards the support platform 10 when tilting, thus being conducive to improving the safety when the lifting mechanism 40 is folded as well as ensuring the stability of the lifting mechanism 40 before and after folding.

Figure 4:
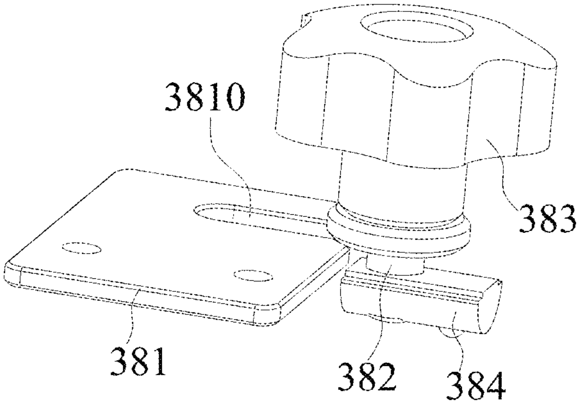
FIG. 4 is a perspective structural schematic view of a first locking structure in FIG. 1.

In an embodiment of the present application, referring to FIG. 1, FIG. 3, and FIG. 4, the first locking structure 38 comprises: a connecting screw rod 382, a locking hook 381, and a third screw member 383. One end of the connecting screw rod 382 is in connection with a lower end of the lifting mechanism 40, the locking hook 381 is configured for locking a middle part of the connecting screw rod 382, the third screw member 383 is in connection with the other end of the connecting screw rod 382, the third screw member 383 is configured to lock the locking hook 381 and the connecting screw rod 382, and the locking hook 381 is installed on the rotating platform 30. In this way, when the lifting mechanism 40 is erected, the locking hook 381 can be hooked on the connecting screw rod 382, and then the third screw member 383 can be screwed to lock the locking hook 381 and the connecting screw rod 382 to keep the lifting mechanism 40 erected. Optionally, the third screw member 383 may be a structure such as a hand wheel, a handle, or a screw nut. Optionally, the locking hook 381 is a plate, and a second slot 3810 is defined in the locking hook 381, and the second slot 3810 is configured for allowing the connecting screw rod 382 to be inserted therein, which can prevent the locking hook 381 from swinging after locking, thus being conducive to improving the stability. In other embodiments, the first locking structure 38 may also adopt a lock catch structure or a bolt structure.

In an embodiment, referring to FIG. 3 and FIG. 4, the lifting mechanism 40 is provided with a second chute 410, and the fixing block 384 is slidably installed in the second chute 410, and the connecting screw rod 382 is in threaded connection with the fixing block 384. The second chute 410 is arranged along a length direction of the lifting mechanism 40, and the second slot 3810 is arranged along the length direction of the lifting mechanism 40, so that the position of the connecting screw rod 382 can be moved along the sliding second chute 410, thereby facilitating the connecting screw rod 382 to enter or exit the second slot 3810.

In an embodiment of the present application, referring to FIG. 1 and FIG. 2, the vehicle ADAS calibration device further comprises a mounting frame 60. The mounting frame 60 is configured for mounting a target. The mounting frame 60 is foldable onto the lifting mechanism 40, the hanging frame 60 is hingedly installed on an upper end of the lifting mechanism 40. In this way, the mounting height of the target can be further increased, and an occupied size after folding can be reduced. Further, the vehicle ADAS calibration device is enabled to satisfy the height requirements for the calibration of heavy truck.

In an embodiment, referring to FIG. 1 and FIG. 2, a second hinge assembly 46 and a second locking structure 47 are installed on the lifting mechanism 40, the second hinge assembly 46 is in hinge connection with a lower end of the mounting frame 60, and the second locking structure 47 is configured to lock the mounting frame 60 and the lifting mechanism 40 in a case where the mounting frame 60 is erected. In this way, when the second locking structure 47 is opened, the mounting frame 60 is foldable onto the lifting mechanism 40, and when the mounting frame 60 is erected, the mounting frame 60 is locked by the second locking structure 47, thereby maintaining the mounting frame 60 erected and ensuring that the target is vertical. Optionally, the second hinge assembly 46 and the second locking structure 47 are respectively located at two ends of the lifting mechanism 40 in the width direction. When the lifting mechanism 40 is unfolded, the second locking structure 47 can cooperate with the second hinge assembly 46 to restrict the swinging of the lifting mechanism 40 and improve the stability of the lifting mechanism 40. Optionally, the second locking structure 47 may be the same or similar structure as the first locking structure 38. A plurality of hinge assemblies 46 and a plurality of second locking structures 47 are provided, which is conducive to improving the stability of the mounting frame 60 after the erection and locking of the mounting frame 60.

Optionally, referring to FIG. 1 and FIG. 2, the second hinge assembly 46 is located on a side of the lifting mechanism 40 away from the support platform 10, and the second locking structure 47 is arranged on a side of the lifting mechanism 40 close to the support platform 10, that is, the mounting frame 60, the lifting mechanism 40, and the support platform 10 are in a "Z"-shaped folded three-section structure, which is conducive to increasing the height of the mounting frame 60, increasing the height of the vehicle ADAS calibration device after being unfolded, and is conducive to reducing the folded height. Moreover, the folding and unfolding of the vehicle ADAS calibration device are facilitated.

In an embodiment of the present application, referring to FIG. 1 and FIG. 2, the second hinge assembly 46 is a damping hinge. The use of the damping hinge can slow down the folding speed of mounting frame 60 when the mounting frame 60 is folded, reduce a supporting force of stopping an upper end of the mounting frame 60 during the folding, and prevent the mounting frame 60 from falling quickly towards the lifting mechanism 40 when tilting, thus being conducive to improving the safety when the mounting frame 60 is folded as well as ensuring the stability of the mounting frame 60 before and after folding. Further, when the lifting mechanism 40 is folded onto the support platform 10, the mounting bracket 60 can be partially opened to form a handle structure, which is configured for pulling the vehicle ADAS calibration device to move.

In an embodiment of the present application, a plurality of mounting bases are installed on the mounting frame 60, and the target is provided with a hanging buckle, which cooperates with and is mounted on one of the mounting bases. This makes it easy to mount the target on the mounting frame 60. Optionally, an annular groove is provided on the hanging buckle, and the annular groove allows the mounting base to be snapped into. A positioning groove is provided on the mounting base, and the hanging buckle is clamped in the positioning groove, which is convenient for fast mounting and dismounting of the target.

Figure 11:
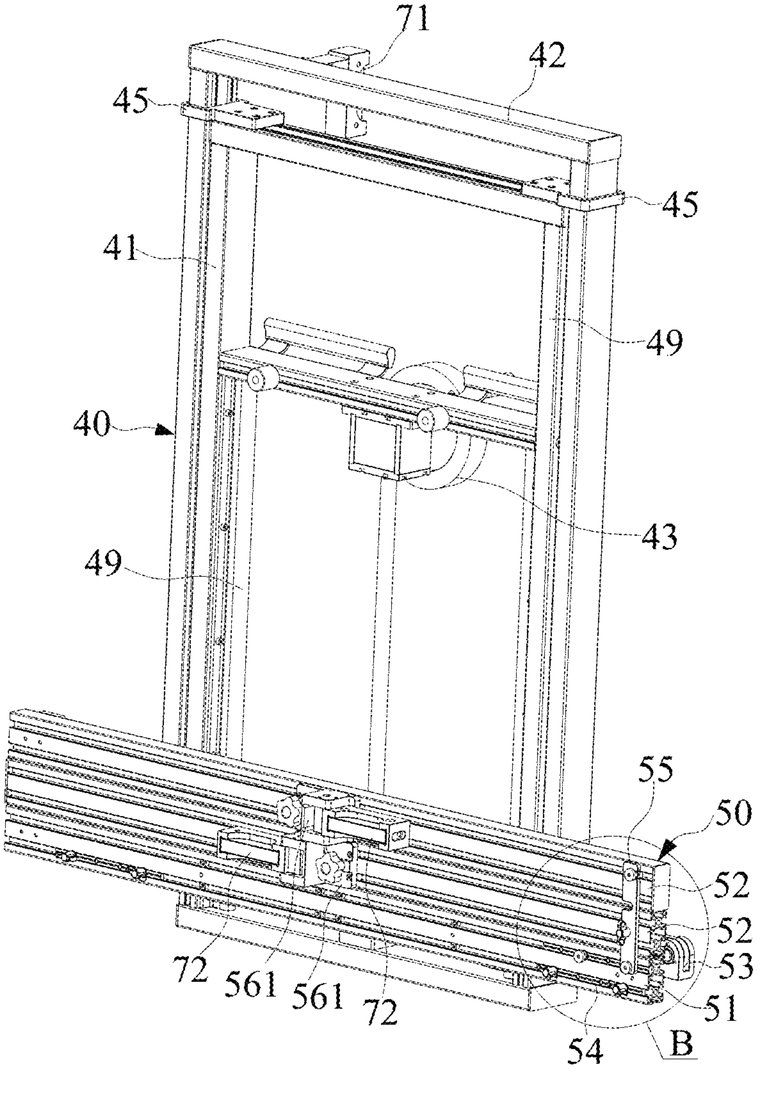
FIG. 11 is a perspective structural schematic view of a lifting mechanism and a foldable arm mechanism when being folded.

In an embodiment of the present application, referring to FIG. 1, FIG. 2, and FIG. 11, the lifting mechanism 40 comprises: a stand 41, a lifting frame 42, and a drive assembly 43. A lower end of the stand 41 is in hinge connection with the support platform 10, and the lifting frame 42 is vertically and slidably installed on the stand 41, the foldable arm mechanism 50 is installed on the lifting frame 42, the drive assembly 43 is installed on the stand 41, and the foldable arm mechanism 50 is in connection with the drive assembly 43. The drive assembly 43 is configured to drive the lifting frame 42 and foldable arm mechanism 50 to ascend and descend. In this way, the height of the lifting mechanism 40 can be increased, and a folded size of the lifting mechanism 40 can be reduced, and the height of the foldable arm mechanism 50 and the target can be adjusted to satisfy the requirements on the centering detection height of the vehicle ADAS calibration device and the mounting height of the target. Specifically, a lower end of the stand 41 is in hinge connection with the rotating seat 31 via the first hinge assembly 37, the first locking structure 38 locks the stand 41 and the rotating seat 31, and an upper end of the lifting frame 42 is in hinge connection with a lower end of the hanging frame 60 via the second hinge assembly 46, and the second locking structure 47 locks the mounting frame 60 and the lifting frame 42, so that the mounting height of the target can be increased, and by adjusting the position and angle of the lifting mechanism 40, the position and angle of the foldable arm mechanism 50 and the target can be adjusted.

Figure 12:
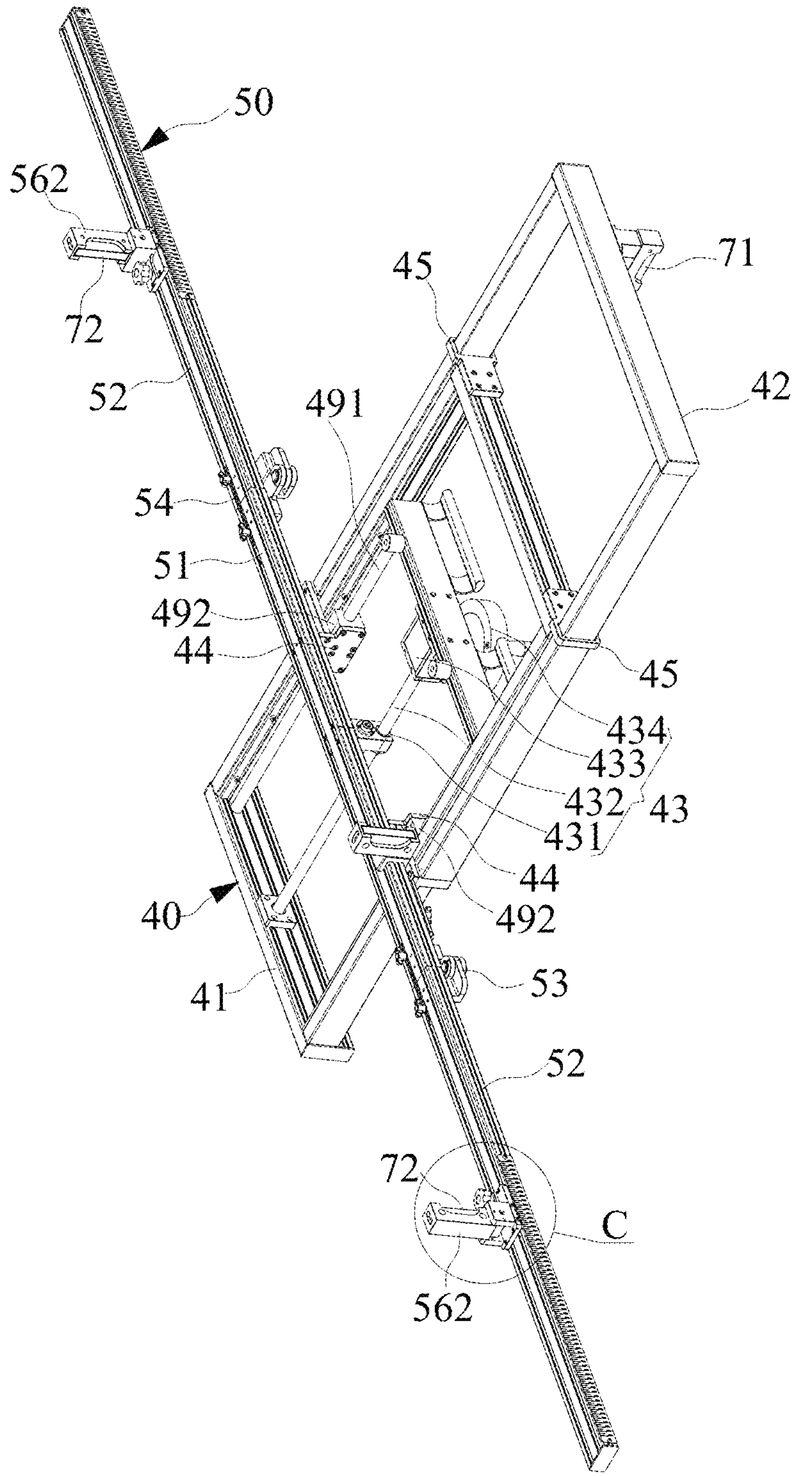
FIG. 12 is a perspective structural schematic view of a lifting mechanism and a foldable arm mechanism when being unfolded.

In an embodiment, referring to FIG. 1, FIG. 11, and FIG. 12, the lower end of the lifting frame 42 is in slidable connection with the stand 41, and the upper end of the stand 41 is in slidable connection with the lifting frame 42, which is conducive to improving the stability between the lifting frame 42 and the stand 41. Optionally, a third slide seat 44 is installed on the lower end of the lifting frame 42, and the third slide seat 44 is in slidable connection with the stand 41. A guide block 45 is installed at the upper end of the stand 41, and the lifting frame 42 is in slidable connection with the guide block 45. The foldable arm mechanism 50 is installed on the third slide seat 44, and the lower end of the lifting frame 42 is in connection with the third slide seat 44. In this way, it is conducive to improving the stability of the foldable arm mechanism 50 and the lifting frame 42 and preventing the lifting frame 42 from swinging.

In an embodiment, referring to FIG. 1, FIG. 11, and FIG. 12, a third guide rail assembly 49 is installed on the stand 41, the third guide rail assembly 49 is arranged along a height direction of the stand 41, and the third guide rail assembly 49 is in slidable connection with the lifting frame 42 and the stand 41. Optionally, the third guide rail assembly 49 comprises a third guide rail 491 and a third slider 492. The third guide rail 491 is installed on the stand 41, the third slider 492 is installed on the third slide 44, and the third slider 492 is in slidable connection with the third guide rail 491 to guide the lifting frame 42 to move linearly on the stand 41.

In an embodiment of the present application, referring to FIG. 11 and FIG. 12, the drive assembly 43 comprises: a connecting screw nut 431, a transmission screw mandrel 432, a gear box 433, and a screwing structure 434. The connecting screw nut 431 is installed on the foldable arm mechanism 50. The transmission screw mandrel 432 is in connection with the connecting screw nut 431, and the transmission screw mandrel 432 is rotatably installed on the stand 41. The gear box 433 is installed on the stand 41, the gear box 433 is in connection with the transmission screw mandrel 432, and the screwing structure 434 is in connection with the gear box 433. In this way, the lifting frame 42 can be controlled to go up and down by rotating the screw structure 434, so as to adjust the heights of the foldable arm mechanism 50 and the target. It can be understood that in other embodiments, the lifting of the lifting frame 42 may also be realized by using a turbine and a worm to drive the transmission screw mandrel or the gear to rotate.

In an embodiment of the present application, referring to FIG. 11 and FIG. 12, a first detector 71 is detachably installed on the lifting frame 42, and the first detector 71 is configured to detect the height of the lifting frame 42, which facilitates the adjustment of the heights of the foldable arm mechanism 50 and the lifting frame 42. In addition, the first detector 71 is disassembled during transportation to avoid loss or damage.

Figure 13:
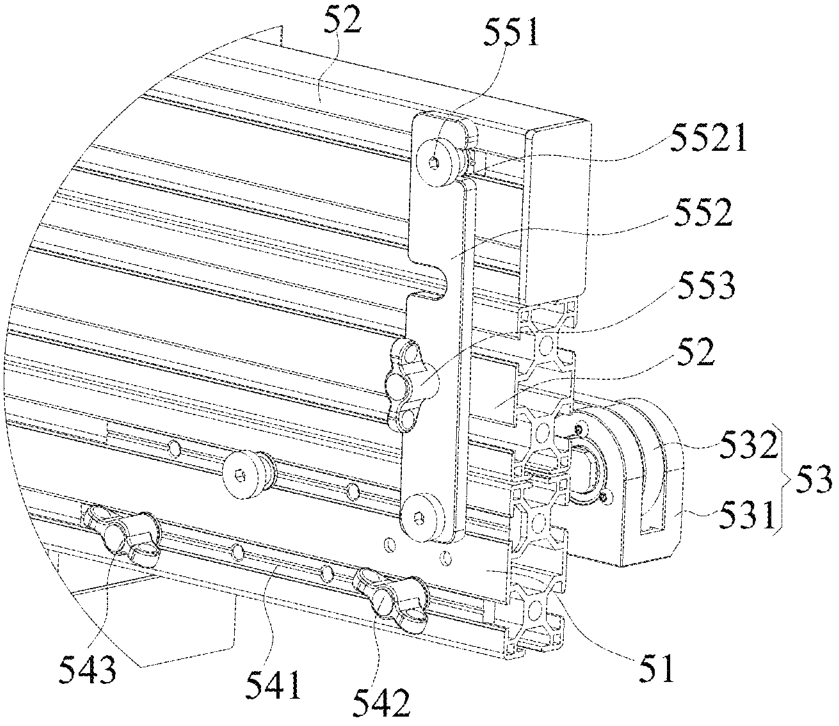
FIG. 13 is an enlarged view of part B in FIG. 11.

In an embodiment of the present application, referring to FIGS. 11-13, the foldable arm mechanism 50 comprises a connecting arm 51, two branch arms 52, and two third hinge assemblies 53. The connecting arm 51 is installed on the lifting mechanism 40, the two branch arms 52 are respectively arranged at two ends of the connecting arm 51, and the two third hinge assemblies 53 respectively hinge the two branch arms 52 to the two ends of the connecting arm 51. In this way, the folding and unfolding of the branch arm 52 can be realized through the third hinge assembly 53, so as to reduce the length of the unfolding foldable arm mechanism 50 after being folded. Further, in this way, the length of the foldable arm mechanism 50 increase to adapt to the width of the heavy truck and satisfy the calibration requirements of the heavy truck. Specifically, two ends of the connecting arm 51 are connected to the third slide seat 44, respectively, and a middle part of the connecting arm 51 is in connection with the connecting screw nut 431, so as to ensure the stability of the foldable arm mechanism 50 and the lifting frame 42.

In an embodiment, referring to FIGS. 11-13, the third hinge assembly 53 comprises a hinge base 531 and a hinge arm 532, the hinge arm 532 is hinged on the hinge base 531, one end of the hinge base 531 is in connection with the connecting arm 51, one end of the hinge arm 532 is in connection with a branch arm 52, and the other end of the hinge arm 532 is in hinge connection with the other end of the hinge seat 531, so that the branch arm 52 is folded around the hinge point and placed on the connecting arm 51. In this way, it is convenient to control the rotation angle of the hinged arm 532 and the hinged base 531, and it is beneficial to control the folded branch arm 52 to be arranged in parallel to the connecting arm 51, so as to reduce the occupied space.

In an embodiment of the present application, referring to FIG. 1 and FIG. 2, a support frame 14 is installed on the support platform 10, an abutment frame 48 is installed on an upper end of the lifting mechanism 40. In a case where the lifting mechanism 40 is folded onto the support platform 10, the abutment frame 48 is supported on the support frame 14, and the abutment frame 48 is configured to support the lifting mechanism 40. This can enhance the stability of the lifting mechanism 40 after being folded, and prevent the lifting mechanism 40 after being folded from swinging up and down, which would otherwise cause wear on the connecting positions, such as the first hinge assembly 37, and affect the stability of the vehicle ADAS calibration device after unfolding. Moreover, after the lifting mechanism 40 is folded, the height of the abutment frame 48 matches a sum of the heights of the centering platform 20 and the rotating platform 30 to ensure that the lifting mechanism 40 is horizontally supported on the support platform 10. Specifically, the abutment frame 48 is installed on an upper end of the stand 41, which can improve the stability of the lifting mechanism 40 folded onto the support platform 10.

Optionally, referring to FIG. 1, FIG. 2, and FIG. 5, a shock absorbing strip 15 is installed on the support frame 14. When the lifting mechanism 40 is folded, the abutment frame 48 can abut against the shock absorbing bar 15, moreover, during transportation, the shock absorbing bar 15 can buffer the shaking between the stand 41 and the support platform 10.

In an embodiment, referring to FIGS. 11-13, the foldable arm mechanism 50 further comprises third locking structures 54. The third locking structures 54 are configured for connecting the two branch arms 52 and the connecting arm 51 when the two branch arms 52 are unfolded. In this way, the stability of the foldable arm mechanism 50 after being unfolded can be enhanced. Optionally, each of the third locking structures 54 comprises: a fixed arm 541, a first fastener 542, and a second fastener 543. The fixed arm 541 is configured to connect a corresponding one of the two branch arms 52 to the connecting arm 51, and the first fastener 542 is configured to lock one end of the fixed arm 541 with the corresponding one of the two branch arms 52, and the second fastener 543 is configured to lock another end of the fixed arm 541 with the connecting arm 51. The first fastener 542 is installed on one end of the fixed arm 541, and the second fastener 543 is installed on the other end of the fixed arm 541. In this way, when the foldable arm mechanism 50 is unfolded, the fixed arms 541 connect and fix the connecting arm 51 and the branch arms 52, which can improve the stability when the foldable arm mechanism 50 is unfolded, and ensure that the branch arms 52 and the connecting arm 51 are horizontal. Optionally, the connecting arm 51 is provided with a first cavity, and each branch arm 52 is provided with a second cavity. One end of the fixed arm 541 is slidably inserted into the first cavity, and the other end of the fixed arm 541 is slidably inserted into the second cavity. In this way, the stability of the branch arm 52 after being unfolded is improved, the movement of the fixed arm 541 is facilitated, which is convenient for the locking and unlocking of the positions of the branch arms 52.

In an embodiment, referring to FIGS. 11-13, the foldable arm mechanism 50 further comprises a fourth locking structure 55, and the fourth locking structure 55 is configured to lock positions of the two branch arms 52 and the connecting arm 51 in a case where the two branch arms 52 are folded, so as to prevent the branch arms 52 after being folded from swinging, and ensure the stability of the positions of the branch arms 52 after being folded.

In an embodiment, referring to FIGS. 11-FIG. 13, the two branch arms 52 are folded on the upper side of the connecting arm 51, which facilitates the unfolding and folding of the branch arms 52. Optionally, a lock catch 551 is installed on a branch arm 52 at a top. The fourth locking structure 55 comprises: a locking bar 552 and a first locking member 553 mounted on the locking bar 552, and the first locking member 553 is configured to lock the locking bar 552 with the two branch arms 52. One end of the locking bar 552 is hingedly installed on the connecting arm 51. The other end of the locking bar 552 is provided with a locking groove 5521. The locking groove 5521 is configured to fit and lock the lock catch 551. With this structure, when the foldable arm mechanism 50 is folded, the locking bar 552 is rotated so that the locking groove 5521 is locked with the lock catch 551; then the first locking member 553 is locked on a corresponding branch arm 52, thereby realizing the fixation of the two branch arms 52 and the connecting arm 51. When the foldable arm mechanism 50 needs to be unfolded, the first locking member 553 is unlocked, and the locking groove 5521 is separated from the lock catch 551, so that the two branch arms 52 can be rotated and unfolded.

Figure 14:
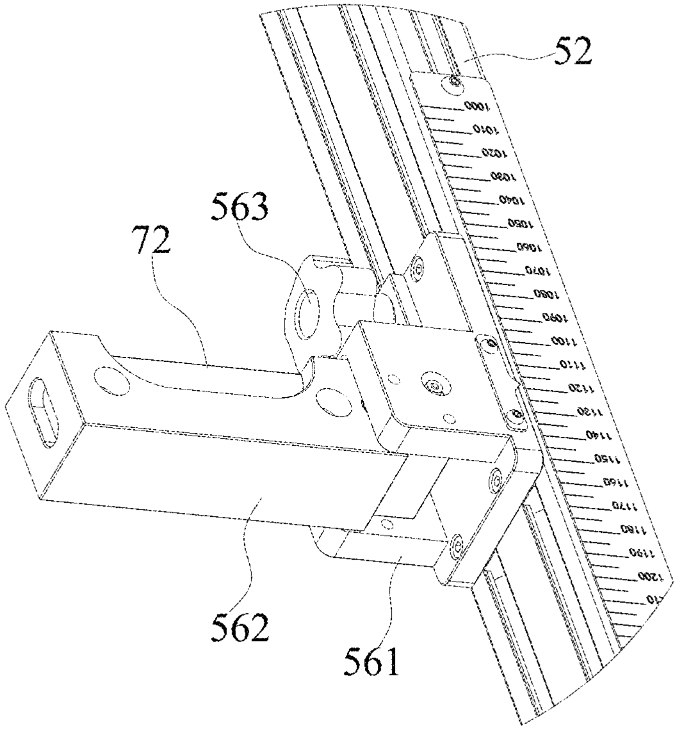
FIG. 14 is an enlarged view of part C in FIG. 12.

In an embodiment of the present application, referring to FIG. 11, FIG. 12, and FIG. 14, the foldable arm mechanism 50 further comprises: a slide base 561, a second locking member 563, and a mounting base 562. The slide base 561 is slidably installed on each of the two branch arms 52, the second locking member 563 is configured to lock the slide base 561 on each of the two branch arms 52, and the mounting base 562 is configured to support an external device; the second locking member 563 is installed on the slide base 561, and the mounting base 562 is hingedly installed on the slide base 561. The external device herein may be a laser for distance measurement and the like. In this way, the slide base 561 can slide on the corresponding branch arm 52 to adjust the position of the external device. After the slide base 561 is adjusted in place, the second locking member 563 is locked to ensure the stability of the position of the external device. Moreover, the mounting base 562 is hingedly installed on the sliding base 561, which can facilitate the folding of the mounting base 562 and prevent collision and damage during transportation.

In an embodiment of the present application, referring to FIG. 11, FIG. 12, and FIG. 14, a second detector 72 is detachably installed on each of the two branch arms 52, and the second detector 72 is configured to detect a vertical distance from a corresponding branch arm 52 to the vehicle, so as to control the centering of the target with the vehicle. Specifically, the second detector 72 is detachably mounted on the mounting base 562. In this way, the second detector 72 can be disassembled during transportation to avoid loss or damage.

In an embodiment of the present application, referring to FIG. 1, FIG. 2, and FIG. 5, the support platform 10 comprises: a base frame 11, a travel assembly 12, and a positioning assembly 13. The travel assembly 12 is configured to support the base frame 11 in a rolling manner, and the positioning assembly 13 is configured to adjust the base frame 11 to be horizontal and to position and support the base frame 11; and the lifting mechanism 40 is in connection with the base frame 11. This facilitates the movement and transportation of the vehicle ADAS calibration device and can ensure the stability and the horizontal state of the support platform 10 during the vehicle calibration. Specifically, the first guide rail 221 is installed on the base frame 11, the length direction of the base frame 11 is the length direction of the support platform 10, and the width direction of the base frame 11 is the width direction of the support platform 10, so that the position of the lifting mechanism 40 on the base frame 11 can be adjusted. When the lifting mechanism 40 is erected, the lifting mechanism 40 can be moved to a middle of the base frame 11 to ensure the stability of the lifting mechanism 40; and when the lifting mechanism 40 is folded, the lifting mechanism 40 can be moved to one end of the base frame 11 to reduce the size occupied by the lifting mechanism 40 and improve the stability after folding.

Optionally, the positioning assembly 13 comprises a plurality of adjustable foot cups 131, which facilitates the movement of the vehicle ADAS calibration device and can keep the position stable after the target is mounted.

Optionally, the travel assembly 12 comprises two steering wheels 122 and two directional wheels 121, the two steering wheels 122 are mounted on one end of the base frame 11, and the steering wheels 122 can rotate toward two sides of the base frame 11 to adjust the moving direction of the support platform 10, the two directional wheels 121 are installed on the other end of the base frame 11, and the directional wheels 121 can prevent the support platform 10 from swinging arbitrarily, thus being convenient to control the moving direction of the support platform 10.

The above descriptions are only preferred embodiments of the present application, and are not intended to limit the present application. Any modifications, equivalent replacements, and improvements made within the spirit and principles of the present application should be included within in the protection scope of the present application.

The invention claimed is:

1. A vehicle advanced driver assistant system (ADAS) calibration device, comprising:

a support platform;

a lifting mechanism, which is foldable onto the support platform and is hingedly installed on the support platform; and a foldable arm mechanism, which is foldable onto the lifting mechanism and is installed on the lifting mechanism, and which comprises:

a connecting arm, which is installed on the lifting mechanism;

two branch arms, which are respectively arranged at two ends of the connecting arm; and third hinge assemblies, which are configured to respectively hinge the two branch arms to the two ends of the connecting arm;

wherein the foldable arm mechanism further comprises a fourth locking structure, which is configured to lock positions of the two branch arms and the connecting arm in a case where the two branch arms are folded onto an upper side of the connecting arm;

a lock catch is installed on a branch arm at a top; and the fourth locking structure comprises: a locking bar, and a first locking member, which is mounted on the locking bar; one end of the locking bar is hingedly installed on the connecting arm; and another end of the locking bar is provided with a locking groove, which is configured to fit and lock the lock catch.

2. The vehicle ADAS calibration device according to claim 1, wherein the vehicle ADAS calibration device further comprises: a centering platform, which is configured for adjusting a position of a target, and a rotating platform, which is configured for adjusting an angle of the target; and the centering platform is installed on the support platform, the rotating platform is installed on the centering platform, and the rotating platform is in hinge connection with a lower end of the lifting mechanism.

3. The vehicle ADAS calibration device according to claim 2, wherein a first guide rail assembly, which is in slidable connection with the centering platform, is installed on the support platform;

the first guide rail assembly is arranged along a length direction of the support platform; and a first locking assembly, which is configured for locking the first guide rail assembly, is installed on the centering platform.

4. The vehicle ADAS calibration device according to claim 2, wherein the centering platform comprises:

a first slide seat, which is arranged along a width direction of the support platform, a second slide seat, which is slidably installed on the first slide seat, a second guide rail assembly, which is in slidable connection with the first slide seat and the second slide seat, and a first adjusting assembly, which is configured for adjusting a moving position of the second slide seat; and the first slide seat and the second slide seat are arranged side by side, the second guide rail assembly is arranged along the width direction of the support platform, the first adjusting assembly is installed on the first slide seat, and the first adjusting assembly is in connection with the second slide seat; and the rotating platform is installed on the second slide seat.

5. The vehicle ADAS calibration device according to claim 4, wherein the first adjusting assembly comprises:

a transmission rack, which is installed on the second slide seat, a drive gear, which meshes with the transmission rack, a support shaft, which is configured to support the drive gear, and a first screw member, which is in connection with the support shaft;

the support shaft is rotatably mounted on the first slide seat; the first screw member is in connection with the support shaft; and a second locking component, which is configured to lock the support shaft, is installed on the first slide seat.

6. The vehicle ADAS calibration device according to claim 2, wherein the rotating platform comprises: a rotating seat, which is rotatably installed on the centering platform, and an angle adjusting assembly, which is configured to adjust a rotation angle of the rotating seat; the angle adjusting assembly is installed on the centering platform; and the angle adjusting assembly is in connection with the rotating seat.

7. The vehicle ADAS calibration device according to claim 6, wherein the angle adjusting assembly comprises: a locking base, which is installed on the rotating seat, a screw nut base, which is installed on the centering platform, and an adjusting screw rod, which drives the locking base to approach or move away from the screw nut base to adjust a rotation angle of the rotating seat;

the adjusting screw rod is installed on the screw nut base; and the adjusting screw rod is provided with a limiting structure configured to lock the locking base.

8. The vehicle ADAS calibration device according to claim 6, wherein the rotating platform further comprises a support bearing, which is rotatably connected to the centering platform and the rotating seat.

9. The vehicle ADAS calibration device according to claim 8, wherein the rotating platform further comprises an elastic member, which is configured to elastically pull the rotating seat to reset.

10. The vehicle ADAS calibration device according to claim 2, wherein a first hinge assembly and a first locking structure are installed on the rotating platform; the first hinge assembly is in hinge connection with a lower end of the lifting mechanism; and the first locking structure is configured to lock the lifting mechanism and the rotating platform in a case where the lifting mechanism is erected.

11. The vehicle ADAS calibration device according to claim 1, wherein the vehicle ADAS calibration device further comprises a mounting frame; the mounting frame is foldable onto the lifting mechanism; and the mounting frame is hingedly installed on an upper end of the lifting mechanism.

12. The vehicle ADAS calibration device according to claim 11, wherein a second hinge assembly and a second locking structure are installed on the upper end of the lifting mechanism;

the second hinge assembly is in hinge connection with a lower end of the mounting frame, and the second locking structure is configured to lock the mounting frame and the lifting mechanism in a case where the mounting frame is erected.

13. The vehicle ADAS calibration device according to claim 1, wherein the lifting mechanism comprises: a stand, a lifting frame, which is vertically and slidably installed on the stand and is in connection with the foldable arm mechanism, and a drive assembly, which is configured to drive the lifting frame and the foldable arm mechanism to ascend and descend; a lower end of the stand is in hinge connection with the support platform; the drive assembly is installed on the stand; and the foldable arm mechanism is in connection with the drive assembly.

14. The vehicle ADAS calibration device according to claim 13, wherein the drive assembly comprises: a connecting screw nut, which is installed on the foldable arm mechanism, a transmission screw mandrel, which is in connection with the connecting screw nut, a gear box, which is in connection with the transmission screw mandrel, and a screwing structure, which is configured to drive the gear box; and the transmission screw mandrel is rotatably installed on the stand, the gear box is installed on the stand, the gear box is in connection with the transmission screw mandrel, and the screwing structure is in connection with the gear box.

15. The vehicle ADAS calibration device according to claim 1, wherein a support frame is installed on the support platform; an abutment frame is installed on the lifting mechanism; and the abutment frame is configured to be supported on the support frame in a case where the lifting mechanism is folded onto the support platform.

16. The vehicle ADAS calibration device according to claim 1, wherein the foldable arm mechanism further comprises third locking structures, which are configured for locking the two branch arms and the connecting arm when the branch arms are unfolded;

each of the third locking structures comprises: a fixed arm, which is configured to connect a corresponding one of the two branch arms to the connecting arm, a first fastener, which is configured to lock one end of the fixed arm with the corresponding one of the two branch arms, and a second fastener, which is configured to lock another end of fixed arm with the connecting arm; and the first fastener is installed on one end of the fixed arm, and the second fastener is installed on the another end of the fixed arm.

17. The vehicle ADAS calibration device according to claim 1, wherein the foldable arm mechanism further comprises: a slide base, which is slidably installed on each of the two branch arms, a second locking member, which is configured to lock the slide base on each of the two branch arms, and a mounting base, which is configured to support an external device; wherein the second locking member is installed on the slide base, and the mounting base is hingedly installed on the slide base.

18. The vehicle ADAS calibration device according to claim 1, wherein the support platform comprises: a base frame, which is configured to support the lifting mechanism, a travel assembly, which is configured to support the base frame in a rolling manner, and a positioning assembly, which is configured to adjust the base frame to be horizontal and to position and support the base frame; wherein the traveling assembly and the positioning assembly are installed on the base frame, respectively.

* * * * *